US010523722B1

(12) United States Patent
Katz et al.

(10) Patent No.: US 10,523,722 B1
(45) Date of Patent: Dec. 31, 2019

(54) SYSTEM AND METHOD FOR SHARED MEDIA SESSION CREATION (71) Applicant: Playlist Media, Inc., San Francisco, CA (US)

(72) Inventors: Karen Marie Katz, Portola Valley, CA (US); Robert Craig Davidorf, San Francisco, CA (US); Steve Petersen, Los Gatos, CA (US); Stefan Gomez, Modesto, CA (US)

(73) Assignee: Playlist Media, Inc., San Francisco, CA (US)

( * ) Notice: Subject to any disclaimer, the term of this patent is extended or adjusted under 35 U.S.C. 154(b) by 216 days.

(21) Appl. No.: 15/589,878

(22) Filed: May 8, 2017

Related U.S. Application Data (60) Provisional application No. 62/333,457, filed on May 9, 2016.

(51) Int. Cl.
H04L 29/06 (2006.01)
H04N 21/233 (2011.01)
H04L 29/08 (2006.01)
G06F 16/635 (2019.01)
G06F 16/9535 (2019.01)

(52) U.S. Cl.
CPC ........ H04L 65/4015 (2013.01); G06F 16/635 (2019.01); G06F 16/9535 (2019.01); H04L 65/403 (2013.01); H04L 67/22 (2013.01); H04L 67/306 (2013.01); H04N 21/233 (2013.01); H04L 67/10 (2013.01)

(58) Field of Classification Search
CPC ... H04L 65/4015; H04L 65/403; H04L 67/10; H04L 67/22; H04L 67/306; H04N 21/233; G06F 16/635; G06F 16/9535
See application file for complete search history.

(56) References Cited

U.S. PATENT DOCUMENTS

| 2003/0225834 | A1 | 12/2003 | Lee et al. | |
|---|---|---|---|---|
| 2007/0128899 | A1* | 6/2007 | Mayer | G06F 9/4406 439/152 |
| 2008/0177994 | A1* | 7/2008 | Mayer | G06F 9/4418 713/2 |
| 2009/0265369 | A1 | 10/2009 | Hyman et al. | |

(Continued)

OTHER PUBLICATIONS

USPTO; Final Office Action for U.S. Appl. No. 15/589,867 dated Jun. 19, 2019, 9 pages.

(Continued)

Primary Examiner — Davoud A Zand
(74) Attorney, Agent, or Firm — NK Patent Law (57) ABSTRACT A system for creating a shared media streaming session includes a memory and a processor. The processor is operable to, for each user in a shared media streaming session, retrieve a user track list and user playback history associated with the user from the memory; filter the user track lists according to predetermined rules; combine the filtered user track lists to create a session segment; generate a pool of recommended tracks; and determine whether there are multiple users in the shared media streaming session. The processor may further be operable to determine whether the session segment complies with licensing rules, and add the session segment to a session track list to be streamed to users of the shared media streaming session.

20 Claims, 7 Drawing Sheets (56) References Cited

U.S. PATENT DOCUMENTS

2010/0031366 A1\* 2/2010 Knight .................. G06Q 10/10
 726/26
2017/0093943 A1 3/2017 Alsina et al.
2017/0286051 A1 10/2017 Mendes et al.

OTHER PUBLICATIONS

USPTO; Non-Final Office Action for U.S. Appl. No. 15/589,867 dated Oct. 1, 2019, 16 pages.

\* cited by examiner

SYSTEM AND METHOD FOR SHARED MEDIA SESSION CREATION

CROSS-REFERENCE TO RELATED APPLICATION

This application claims the benefit of priority of U.S. provisional patent application No. 62/333,457 entitled "METHODS AND SYSTEMS FOR SYNCHRONOUS, INTERACTIVE CONTENT STREAMING SERVICE" filed on May 9, 2016, which is incorporated herein in its entirety by this reference.

BACKGROUND

Today, an increasing number of people use Internet streaming services for entertainment. Media content companies provide streaming media services including catalog services, a content delivery network, and per-stream billing services that allow media applications to stream content to individual listeners on mobile devices very cost effectively. Media streaming services are convenient, as they allow users to view desired media content on-demand and gain access to large catalogs of content at relatively low-cost. However, these services are not set up for multicast or broadcast delivery of media, which generally needs more expensive technology support to deliver and track playback for billing purposes. Moreover, media streaming can be a lonely experience, because other people do not see the same content at the same time, unless those other people are physically present in the same room. Further, sharing the content with other people in the same room on small mobile devices can be a difficult experience.

Numerous technologies exist for broadcast and/or multicast synchronized streaming of media ranging from low-level technology such as MPEG4 which provides clock synchronization primitives, to full-scale audio-over-IP systems. However, there remains a need for a system that delivers synchronized media playback to one or many users, mimicking the behavior of a multicast or broadcast network, but taking advantage of the low cost and ease-of-use of a streaming media content provider, and by doing so, drastically reducing the cost associated with synchronized streaming while leveraging widely-available computer and mobile phone technologies.

There are also numerous challenges in creating a media presentation in a synchronized multi-user streaming environment, including determining content that each user likes, adhering to the DMCA Performance Complement, and providing content over multiple sessions that does not repeat or duplicate a previous experience, thereby keeping the experiences fresh and enjoyable for users of the system.

Several companies offer technology to create playlists based on a set of music qualities or rules specified by the user, however, none of the technologies currently available address the challenge of creating a media presentation for a group of users in real-time. There remains a need for systems and methods for selecting and delivering media within a share media presentation that addresses these challenges.

SUMMARY OF THE INVENTION

The present invention relates to the creation of shared media presentations in a synchronized, multi-user streaming system. The current application discloses methods and systems for synchronous, interactive content streaming service, enabling multiple users to interact with one another while simultaneously consuming synchronized streaming content. Specifically, a system and method for synchronized playback of downloaded streams is provided, which allows for synchronizing media downloaded in typical streaming formats (such as MP3 or AAC audio) between many users on mobile or stationary devices such as mobile phones or personal computers. Methods are presented to maintain both loose synchronization (to within 50 ms between streams) over a wide-area network down to tight synchronization (to within 12 ms, simultaneous to the human ear) in a local area network.

The current application also discloses systems and methods for creating synchronous streaming media sessions which allow for a shared listening experience between multiple users. Methods are presented for mixing in multiple users' liked tracks, filling the presentation with similar content that the user group might like, maintaining compliance with the DMCA Performance Complement, and filtering content based on rules that allow session-to-session variability and dynamism.

According to one embodiment, a recommendation engine suggests new content for the user to consume. The server stores history of the user playback history in a database. The database also stores external influences that existed when the user consumed particular track. For example, the database stores the time of day when the user listened to a particular track. According to another embodiment, the database stores user's location when the user listened to a particular track. The database also stores the user's comments, and the user's actions (such as whether the user repeated the track, or skipped the track) associated with a particular track. The recommendation engine, based on the information contained in the database, and based on current external influences (such as time of day, or user location) recommends new tracks to the user.

According to another embodiment, a social network plug-in (such as Facebook, or a Twitter plug-in) monitors a user's social network account (such as a Facebook, or a Twitter account) for a key phrase. The key phrase comprises a keyword and a content selection. For example, the content selection can be a name of a song, name of a video, or a link to a song or a video. In one embodiment, the keyword is a hashtag of the name of the service. The social network plug-in detects the key phrase and adds the content selection to an existing playlist. In another embodiment, the social network plug-in creates a new playlist for the user.

According to one embodiment of the present invention, a method of creating a shared media streaming session is provided. The method may include at a server with a memory and a processor, for each user in a shared media streaming session, retrieving a user track list and user playback history associated with the user from the memory. The method may further include filtering the user track lists according to predetermined rules. The method may further include combining the filtered user track lists to create a session segment. The method may further include generating a pool of recommended tracks. The method may further include determining whether there are multiple users in the shared media streaming session. The method may further include, in response to a determination that there is a single user, adding a plurality of recommended tracks to the session segment. The method may further include, in response to a determination that there are multiple users, identifying user-favored tracks in the session segment based on the user playback histories and moving the user-favored tracks to the top of the session segment. The method may further include determining whether the session segment complies with licensing rules, and in response to a determination that the session segment does not comply with licensing rules, adding enough recommended tracks to the session segment to comply with the licensing rules. The method may further include adding the session segment to a session track list to be streamed to users of the shared media streaming session.

According to another embodiment of the present invention, generating a pool of recommended tracks may include applying clustering algorithms to the user playback histories to generate a seed group, wherein each seed of the seed group is a user-favored track. Generating a pool of recommended tracks may further include generating a plurality of normalized vectors containing track characteristics and user characteristics corresponding to each of the seeds. Generating a pool of recommended tracks may further include for each of the plurality of normalized vectors, applying a multiclass classification algorithm to the normalized vector to determine the recommendation probability, wherein the recommendation probability is the probability that the track characteristics and user characteristics of the normalized vector will yield successful recommendations. Generating a pool of recommended tracks may further include identifying tracks with track characteristics and user characteristics corresponding to the track characteristics and user characteristics with the highest recommendation probability. Generating a pool of recommended tracks may further include putting the identified tracks in a pool of recommended tracks.

According to one embodiment of the present invention, a system of creating a shared media streaming session is provided. The system may include a memory and a processor, the processor operable to, for each user in a shared media streaming session, retrieve a user track list and user playback history associated with the user from the memory. The processor may further be operable to filter the user track lists according to predetermined rules. The processor may further be operable to combine the filtered user track lists to create a session segment. The processor may further be operable to generate a pool of recommended tracks. The processor may further be operable to determine whether there are multiple users in the shared media streaming session. The processor may further be operable to, in response to a determination that there is a single user, add a plurality of recommended tracks to the session segment. The processor may further be operable to, in response to a determination that there are multiple users, identify user-favored tracks in the session segment based on the user playback histories and moving the user-favored tracks to the top of the session segment. The processor may further be operable to determine whether the session segment complies with licensing rules, and in response to a determination that the session segment does not comply with licensing rules, add enough recommended tracks to the session segment to comply with the licensing rules. The processor may further be operable to add the session segment to a session track list to be streamed to users of the shared media streaming session.

According to another embodiment of the present invention, the processor may be further operable to generate a pool of recommended tracks by applying clustering algorithms to the user playback histories to generate a seed group, wherein each seed of the seed group is a user-favored track. The processor may be further operable to generate a pool of recommended tracks by generating a plurality of normalized vectors containing track characteristics and user characteristics corresponding to each of the seeds. The processor may be further operable to generate a pool of recommended tracks by, for each of the plurality of normalized vectors, applying a multiclass classification algorithm to the normalized vector to determine the recommendation probability, wherein the recommendation probability is the probability that the track characteristics and user characteristics of the normalized vector will yield successful recommendations. The processor may be further operable to generate a pool of recommended tracks by identifying tracks with track characteristics and user characteristics corresponding to the track characteristics and user characteristics with the highest recommendation probability. The processor may be further operable to generate a pool of recommended tracks by putting the identified tracks in a pool of recommended tracks.

According to another embodiment, the tracks may be music files.

According to another embodiment, the tracks may be video files.

According to another embodiment, the predetermined rules may be based on user playback history.

According to another embodiment, filtering the user track lists may include removing tracks that have been played recently.

According to another embodiment, the track characteristics include genre, release data or era, rank or other measure of popularity, tempo, melodic range, dynamics, and rhythm.

According to another embodiment, the user characteristics include age, gender, and social graph characteristics.

In all of the above embodiments, the server is configured to automatically comply with the legal licensing requirements.

Still other aspects, features, and advantages of the invention are readily apparent from the following detailed description when illustrated by a number of particular embodiments and implementations, including the best mode contemplated for carrying out the invention. The invention is also capable of other and different embodiments, and several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

These and other objects, features, and characteristics will become more apparent to those skilled in the art from a sturdy of the following Detailed Description in conjunction with the appended claims and drawings, all of which form a part of this specification. While the accompanying drawings include illustrations of various embodiments, the drawings are not intended to limit the claimed subject matter.

DETAILED DESCRIPTION

In the following description, for the purposes of explanation, numerous specific details are set forth in order to provide a thorough understanding of the embodiments of the invention. One skilled in the art will recognize that the embodiments of the invention may be practiced without these specific details or with an equivalent arrangement. In other instances, well-known structures and devices are shown in block diagram form in order to avoid unnecessarily obscuring the embodiments of the invention.

The presently disclosed subject matter is presented with sufficient details to provide an understanding of one or more particular embodiments of broader inventive subject matters. The descriptions expound upon and exemplify particular features of those particular embodiments without limiting the inventive subject matters to the explicitly described embodiments and features. Considerations in view of these descriptions will likely give rise to additional and similar embodiments and features without departing from the scope of the presently disclosed subject matter.

Figure 1:
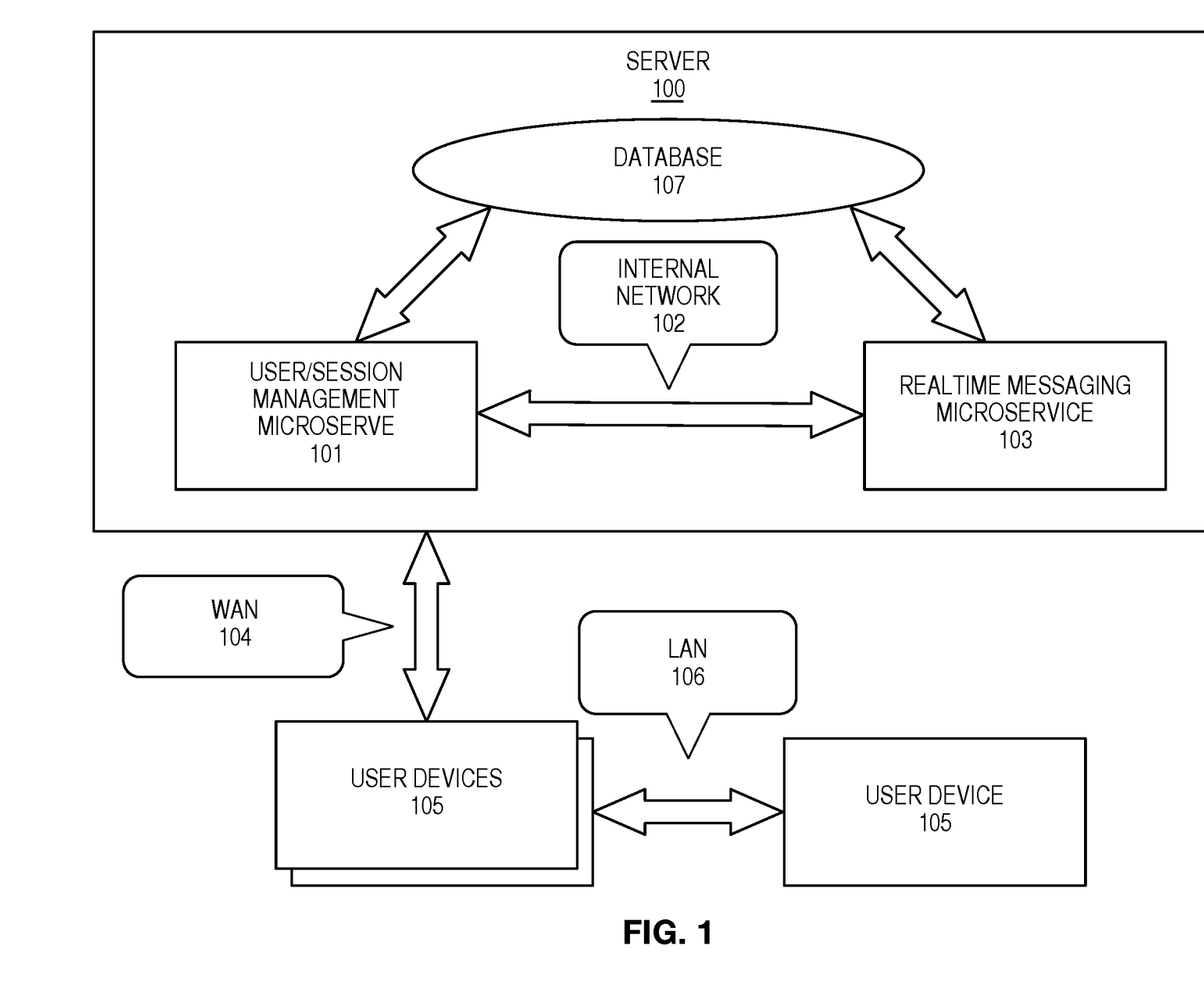
FIG. 1 is a diagram of the system architecture according to certain embodiments of the present invention.

Referring now to FIG. 1, the system is composed of a server 100 containing a user/session management microservice 101, a real-time microservice 103, and a database 107 which communicate on an internal network 102. The server 100 complex communicates with one or more user devices 105 over a wide-area network (WAN) 104, and the user devices 105 may communicate with each other over a local-area network (LAN) 106 in the case of "tight" synchronization, or they may be completely autonomous in the case of "loose" synchronization. These novel synchronization methods allow synchronous delivery of media content to any computer or mobile device over existing public and private data networks.

Synchronized media playback in both the loose and tight modes relies on clock synchronization between all of the entities involved in the playback experience, including the user devices 105, and server microservices 101, 103. For loose synchronization, one embodiment of this invention uses widely-available Network Time Protocol (NTP) running on each of the microservices 101, 103 and user devices 105. For tight synchronization, one embodiment of this invention uses the Precision Time Protocol (PTP) running on all nodes, or PTP running in the server nodes and a GPS-based time synchronization protocol running in suitably-enabled mobile phones, or GPS-augmented time synchronization protocol running in a mobile carrier network.

Tight synchronization is not achievable with NTP alone, but requires PTP or GPS-based clocks. However, the logic and algorithms implemented in the system are designed to attempt to achieve "perfect" synchronization (0ms synchronization) at all times, achieving tight or loose synchronization between any given user devices 105 in the system based solely on what clock synchronization technology is available to the components of the system. In this way, the system can be implemented as a loose-synchronization system, a tight-synchronization system, or as a hybrid system, partitioned such that a partition of the system provides tight synchronization to those user devices 105 capable of tight synchronization (by means of stronger clock synchronization), thereby tailoring behavior to available resources, and reducing cost of the system as a whole.

UTC timestamps are used throughout the system to stay independent of local time differences and interpretation (e.g., timezones and daylight savings time changes).

The microservices 101, 103 can be implemented using standard server technologies such as Ruby on Rails (RoR) or other equivalent technology, and in the case of the real-time microservice, should be implemented with care to reduce scheduling latency for operations that are time-sensitive, as discussed below. The database 107 can be implemented with standard high-performance database technologies such as MongoDB or PostGRES database technology.

In some embodiments, the server 100 may receive at least one comment from one of the user devices 105 over a data network, such as a WAN, and may send the at least one comment to a remainder of the plurality of user devices 105 for display through the user applications over the data network.

The WAN 104 and LAN 106 are exemplary communication networks and the present invention is not limited to the use of those networks. The one or more user devices 105 may communicate with the server 100 complex or other user devices 105 via any one or more networks such as a data network, a wireless network, a telephony network, or any combination thereof. The data network may be any LAN, WAN, metropolitan area network (MAN), a public data network (e.g., the Internet), short range wireless network, or any other suitable packet-switched network, such as a commercially owned, proprietary packet-switched network (e.g., a proprietary cable or fiber-optic network, and the like, or any combination thereof). In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The user devices 105 executing user applications may be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, the accessories and peripherals of these devices, or any combination thereof.

Figure 2:
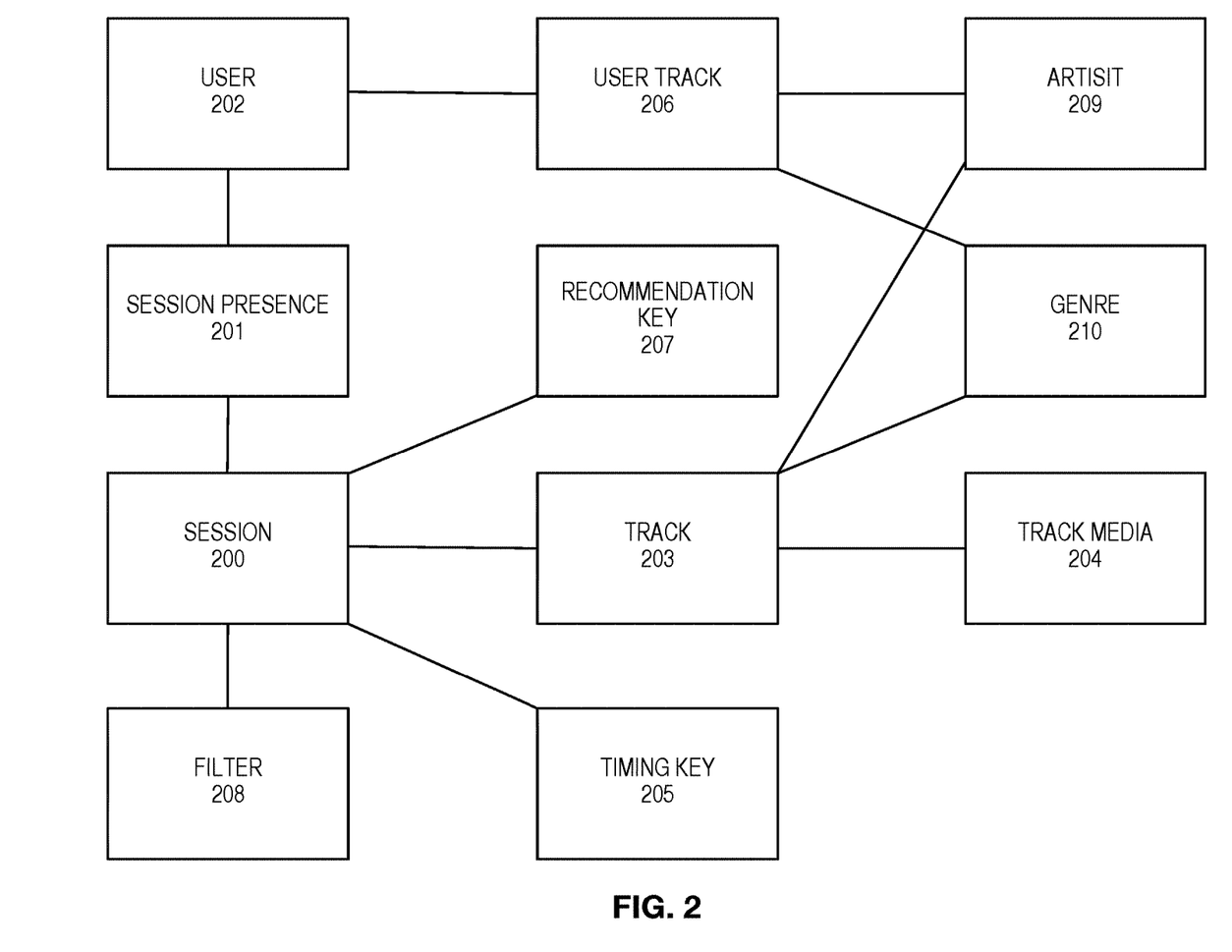
FIG. 2 is a diagram of the data architecture in a database according to certain embodiments of the present invention.

Referring now to FIG. 2, data relationships are maintained in the database 107. The system as a whole supports unlimited simultaneous sessions 200, each containing an ordered list of tracks 203 that make up the playback experience. Each track 203 has a "duration" field and multiple associated track media 204 objects which are individually trackable, downloadable, streamable media files in standard download format (such as MP3, AAC, etc. for audio; MPEG4, AVI, MOV, etc. for video). A session 200 furthermore contains a timing key 205, which is a reference to a timing signal generator process that runs on the real-time microservice 103 and will be described in detail below. Each session 200 also contains an unordered list of session presences 201 which each have an associated user 202, which represent a user device 105 in the system.

Tracks 203 as used herein is not limited to audio files, but may include other streamable media files including video.

The session 200 object represents a synchronized playback experience, and includes fields that help manage the timing, duration, user participation, and content of the playback experience. This object will be described in more detail below. The user 202 object includes user-specific data which can include user identity, social graph (friends or followers), listening preferences, and the like. The user 202 object also includes a list of user tracks 206 which consist of tracks 203 that the user 202 has previously determined that they like to listen to, which can, depending on the desired behavior, be added to the session's 200 track 203 list once the user 202 has joined a session 200. The session presence 201 object contains an "is_present" field that signifies whether the associated user is currently present in the session 200, and allows the system to determine the total number of participants in a session 200 over time, including those who have left the session 200. The session presence 201 object additional contains an "is_contributing" field that signifies whether the associated user is currently contributing their user track 206 list to the session 200.

The user/session management microservice 101 is responsible for session 200 management functions on behalf of users 202 in the system, including the following functions in Table 1:

TABLE 1

Session Management Functions

| Behavior | Affects Timing? | Description |
| --- | --- | --- |
| 300 Join | NO | Join an existing session 200. A session presence 201 is created for the user 202 and the user 202 is added to the synchronized playback experience. |
| 301 Start | YES | Start a new session 200. A session 200 is created in the system and a session presence 201 is created for the user 202. |
| 302 Leave | NO | Leave an existing session 200. The session presence 201 "is_present" field is set to FALSE for the user 202, removing the user 202 from the synchronized playback experience. |
| 303 Modify | NO | Modifies a user's 202 contribution to the session 200. If set to TRUE, the user's 202 user tracks 206 are added to the session 200 track 203 list to be played back to all of the session's 200 users 202. If set to FALSE, the user's 202 user tracks 203 are removed from the session 200 track 203 list if they had initially been added. |
| 304 Advance | YES | Skips the currently playing session 200 track 203. |
| 305 Current | NO | Returns the currently playing track 203 in the session 200. |
| 306 Next | NO | Returns the next track 203 to play in the session 200. |
| 307 Resync | NO | Returns session 200 information that allows the requesting user 202 to synchronize to the current playback position in the session 200. |
| 308 List | NO | Returns a list of active sessions 200 in the system based on some filtering criteria that establishes relevance for the user 202, for example sessions 200 that the user's 202 social graph members are currently in, or sessions 200 who's users 202 are geographically close the user 202. |

Some of the session 200 management functions in Table 1 affect the session timing and therefore the synchronization of the session 200 for all listening users 202. Those functions are marked as "YES" in the "Affects Timing?" column and flow diagrams of these important behaviors will be provided below.

In addition to session 200 management, the user/session management microservice 101 is responsible for providing behaviors for user device 105 including adding new users 202 to the system, managing their application preferences, and other functions. Behaviors that have an impact on shared media session creation are shown in Table 2.

TABLE 2

User Management Functions That Affect Session Creation

| Behavior | Affects Content? | Description |
| --- | --- | --- |
| 400 Add To User Tracks | YES | Adds a media item to the user's user track 206 list. If the user 202 is contributing to the session 200, the session's track 203 list is modified as described in more detail below. |
| 401 Remove From User Tracks | YES | Removes a media item from the user's user track 206 list. If the user 202 is contributing to the session, the session's track 203 list is modified as described in more detail below. |
| 402 Express Music Preference | YES | The user 202 expresses some preference for a currently playing track 203 in the session 200 (like, dislike, love, hate, etc.) to the user's user track 206 list. If the user 202 is contributing to the session 200, the session's track 203 list is modified as described in more detail below. |

Figure 3:
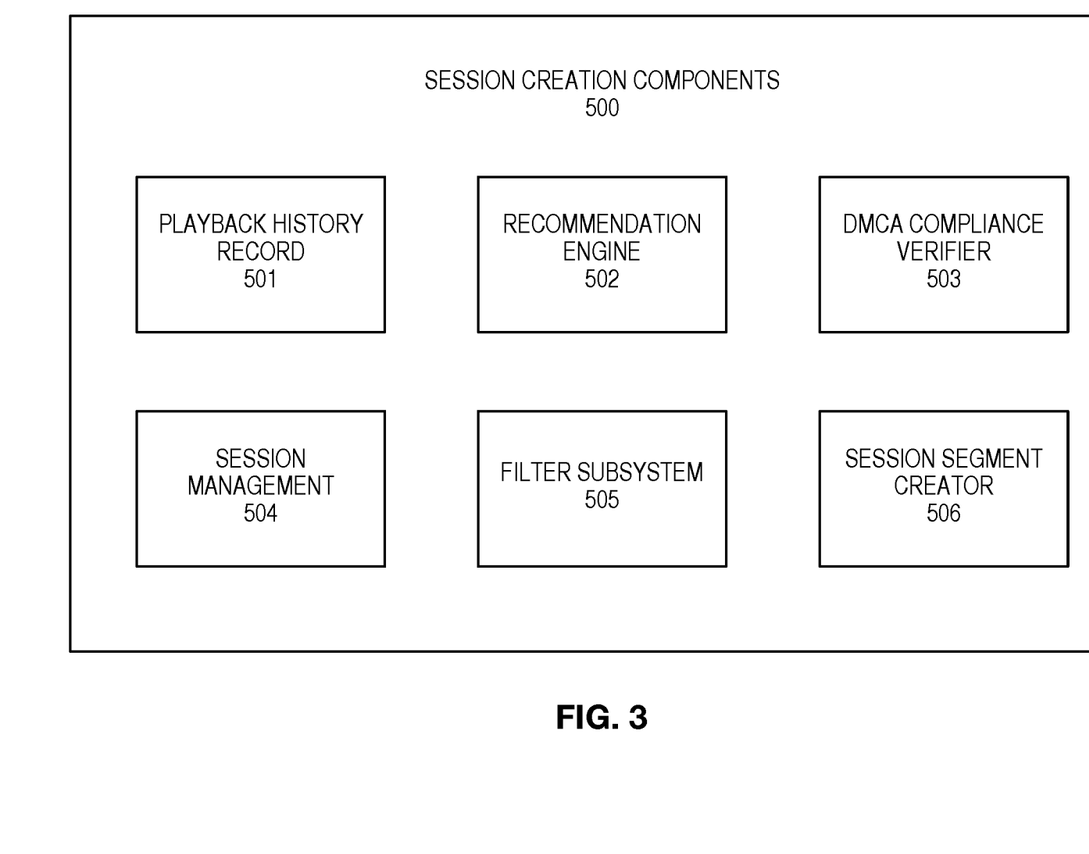
FIG. 3 is a diagram of the software components in the session presentation creation process according to certain embodiments of the present invention.

Referring now to FIG. 3, multiple software components collaborate in the session presentation creation process. These modules and their general responsibilities/behaviors will be described below.

The session management 504 component contains the high-level controlling logic for the shared media session creation process, determining when and how to update the session track 203 list, and controlling the track 203 list size. It uses the other components to perform specific behaviors in the process.

The playback history record 501 stores playback history on a per-user 202 basis, keeping track of what tracks 203 a user has listened to, when the user 202 listened to it, and for how long they listened (the listening duration can be less than the duration of the track 203, for example, if the track 203 was skipped during playback or the user 202 left a session 200 in the middle of a track 203).

The recommendation engine 502 takes a list of seed user tracks 206 or their artists 209 or genre 210 and returns a list of related tracks 203. The behavior of this module will be discussed in greater detail below.

The filter subsystem 505 allows one or more filters to be applied to a list of user tracks 206. The filter can be of any nature. In one embodiment, the filter uses the playback history record 501 to remove or de-prioritize user tracks 206 that have been played recently. In other embodiments, the filter would remove or de-prioritize user tracks 206 that were released prior to 1980. Other filters are envisioned that allow the system to establish a preference for some user tracks 206 over others, given some criteria that could be user-based, session-based, or otherwise derived. Additionally, multiple filters can be daisy-chained to create complex filtering behaviors.

The DMCA compliance verifier 503 ensures that any list of session tracks 203 that is ready for presentation to user devices 105 passes the DMCA Performance Complement rules, which limit the number of times a song, artist, or album can appear in within a given time frame for a performance.

The session segment creator 506 takes an input set of filtered user track 206 list, per-user playback history from the playback history record 501, and creates a DMCA-verified presentation segment that is ready to be presented to active users 202 in a session 200.

More specific behavior for each of these modules will be discussed in the section below.

In the session management and user management functions that affect content shown in Tables 1 and 2, the system modifies the current session track 203 list immediately by replacing content beyond the currently playing track 203 with new content based on the new user's and existing users' track 206 lists. By doing so on any material change to the user 202 or session 200, the system is responsive to user 202 behavior (such as a new user 202 joining a session 200 or an existing user 202 modifying their user tracks 206, or a user 202 expressing a preference for the currently playing session track 203, for example). The goal being to affect a subsequent change in the presentation as soon as possible given the new basis for the presentation, and to keep the presentation content, in as close to real-time as possible, fresh, and relevant to all of the users 202 participating in the session 200. Each time a modification is made, the session creation components 500 collaborate to create a new session segment.

Figure 4:
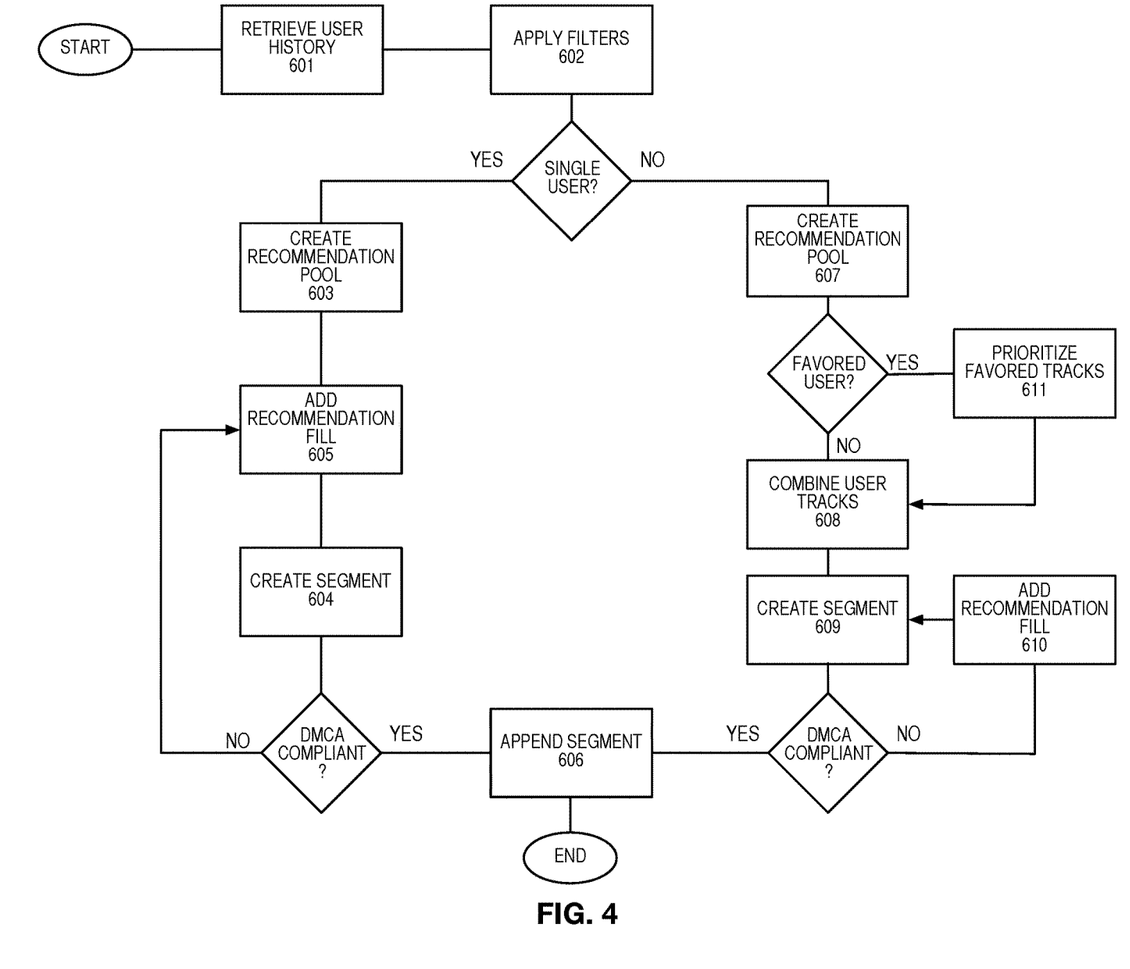
FIG. 4 is a flow chart diagram of the session content modification process according to certain embodiments of the present invention.

Referring now to FIG. 4, once the appropriate changes to the user 202 and session 200 objects have been made, a new session segment is created using the following steps. First, all contributing users' playback history is retrieved 601 and presented along with the users' track 206 lists to the filter subsystem 505 where the system-specified filters are applied 602. At this point, a test is made to determine if only a single user is in the current session 200, in which case it branches to a separate flow that creates a segment using a mix of recommended tracks 203 and user tracks 206. In this branch, a pool of recommended tracks is created 603 from a seed formed by the user's tracks 206, artists 209 and genres 210. On the first attempt, a proportional number of recommended tracks are added 605 based on the user's 202 preference for new music, and a trial segment is created 604 and tested for DMCA compliance. If this test succeeds, the segment is appended to the session track 203 list after the currently playing track 203 in step 606. If the trial segment is not DMCA compliant, more recommended tracks are added 605 until the segment passes the DMCA compliance test, and the segment is appended to the session track 203 list as in the step above. The number of recommended tracks in the recommendation pool 603 is large enough to ensure that the DMCA compliance test will eventually succeed.

If the test for single user fails (there are multiple users 202 in this session 200), the alternate branch is taken. In this branch, a recommended track pool is created 607 based on the aggregate of all users' tracks 206, artists 209 and albums 210 as a seed. A test is made to determine if one user's tracks 206 are "favored," and if so these tracks are prioritized 611 prior to combining 608 with the rest of the user tracks 206. Rather than filling with recommendations first as in the single-user case above, a trial segment is created first attempting to use only user tracks 206, and the goal is, when in a multi-user 202 session 200, the variety that is provided by recommendations in the single-user case is provided by other users 202. In this way, the system creates a social, shared media consumption experience by automatically delivering content provided by other users 202 to the shared media session in real-time, while ensuring DMCA compliance and providing a unique, fresh experience for each session. As before, this trial segment is tested for DMCA compliance, and only if it fails, are recommended tracks added to subsequent trial segments. Once DMCA compliance is satisfied, the segment is appended to the session track 203 list after the currently playing track 203 in step 606.

Figure 5:
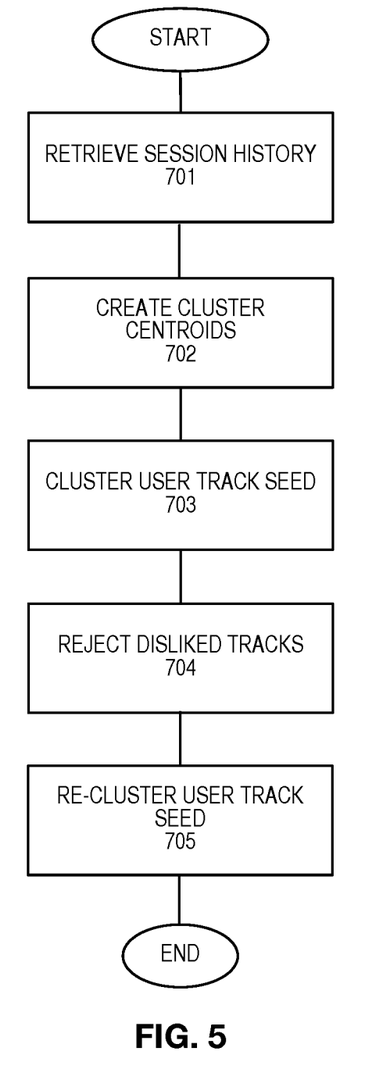
FIG. 5 is a flow chart diagram of the seed conditioning process according to certain embodiments of the present invention.

Referring now to FIG. 5, the recommendation logic performed by the recommendation engine 502 is described. Specifically, FIG. 5 depicts the process of conditioning the seed that is used to create the recommendation pool 603, 607.

The seed conditioning process begins with retrieving the session track 203 playback history 701. This is a history of all previously played media tracks 203, along with an indication of whether they were played fully or skipped. This history may also include expressions of user 202 preference or other signals that show preference for or against a particular track 203. These tracks 203 are used as beginning centroids for a clustering algorithm, which in one embodiment could be a k-means clustering algorithm 702. However, one of ordinary skill in the art will appreciate that the present invention may be implemented with any such clustering algorithm known in the art. Once the centroids have been established, a clustering algorithm is run 703 against the aggregate list of user tracks 206 for all contributors in the session 200. In one embodiment, the clustering space is established using intrinsic attributes of the user tracks 206, such as genre 210, era (e.g. decade of release), popularity, and other attributes. This will split the user tracks 206 into clusters of similar tracks, which would inherit the indication of user 202 preference of the original cluster centroid. Those tracks that cluster around skipped or otherwise non-preferred tracks can be removed (rejected) or otherwise de-prioritized 704. Once removed, the remaining tracks are clustered again in step 705, this time without centroids and with a k-value determined heuristically to provide a balance of recommendation accuracy (as a set of smaller, more uniform seeds will generate a higher-quality recommendation pool than one large amorphous seed) and cost (each cluster of the seed takes some finite time to generate the recommendations from). This seed group is then available for subsequent use as a seed for building the recommendation pool 603, 607.

Music recommendations are challenging due to the sparsity of the underlying data sets and, as a result, a recommendation basis. To provide effective recommendations, a multi-modal approach is used to provide the absolute best recommendation set given a particular seed or seed group of tracks, given that different data sets will perform better or worse based on the nature of the seed.

The algorithm starts by taking the seed group created in 700, and for each seed in the group, using a multi-class classification algorithm to determine which data set to recommend against. The input to the classification algorithm is a normalized vector of characteristics of both the seed tracks and the users 202 in the session 200. In one embodiment, the vector would contain aggregate track characteristics such as genre 210, release data or era, rank or other measure of popularity, tempo, melodic range, dynamics (i.e., loudness), rhythm; aggregate user 202 characteristics such as age or gender; and social graph characteristics such as average distance between nodes, clustering coefficient, and degree (number of nodes each node is linked to). This vector would be applied against the multi-class classifier, which would output a set of probabilities p showing how well (p close to 1) or how badly (p close to 0) that data set would fare if used as a recommendation basis. The system would pick the highest p-value and subsequently use that data set for recommendation for that particular seed.

In one embodiment, once a data set has been selected for each of the seed group members, the members of the seed group could be "unclustered" (those using the same data set re-merged into a larger seed) as a performance optimization.

In one embodiment, the classifier could be a Multiclass Logistic Regression algorithm. The training process for this supervised machine learning algorithm would consist of performing training recommendations against each of the data sets using a set of training seed vectors, capturing the output of the recommendation, and determining the quality of the recommendation based on certain factors of the output track list. These may include the size of the recommended track pool (number of recommended tracks being indicative of the ability of the underlying dataset to produce data) and quality of the resulting track pool. In one embodiment the quality of the track pool can be determined by using a cosine similarity comparison between the output aggregated tracks and the input vector.

New training data for the algorithm would be captured on every recommendation, such that the algorithm could be retrained as the number of recommendations grow, making the system learn the data set quality over time. Additionally, the quality metric for the recommendation output could be augmented by user 202 preference signals from that recommendation pool. For example, if a recommendation is given that is subsequently skipped, the recommendation quality can be perceived to be lower than desired; conversely if the recommended song is subsequently added to a user's 202 user track 206 list, it can be considered of higher quality and hence the quality of the recommendation data set in that case can be considered higher.

In one embodiment, the data sets used for recommendation basis could include: (1) a user-based collaborative filter using the user's 202 social network (user A is linked to user B, user B likes track A); (2) a user-based collaborative filter using global preferences (user A likes track A, user B has similar music taste to user A); (3) an item-based collaborative filter for specific tracks (a user 202 who liked track A also likes track B); (4) an item-based collaborative filter based on artist (user 202 who liked artist A also liked artist B); (5) a default track-characteristic based lookup operation (for track A with specific genre, era, and popularity, return tracks with similar characteristics).

Figure 6:
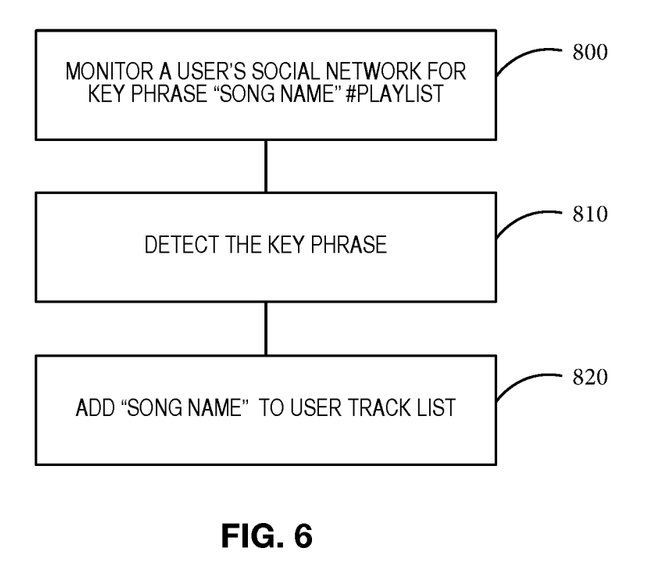
FIG. 6 is a flow chart diagram describing modification of a user track list according to certain embodiments of the present invention.

Referring now to FIG. 6, a flow diagram describing modification of a user track 206 list according to one embodiment is described. A social network plug-in (such as Faceebook, or a Twitter plug-in) monitors a user's social network account (such as a Facebook, or a Twitter account) for a key phrase 800. They key phrase 800 comprises a keyword and a track identification. For example, the track identification can be a name of a song or video, or a hyperlink to a song or a video. In one embodiment, the keyword may be a hashtag of the name of the service. The social network plug-in detects the key phrase 800 and adds the identified track to an existing user track 206 list. In another embodiment, the social network plug-in creates a new user track 206 list for the user 202.

Figure 7:
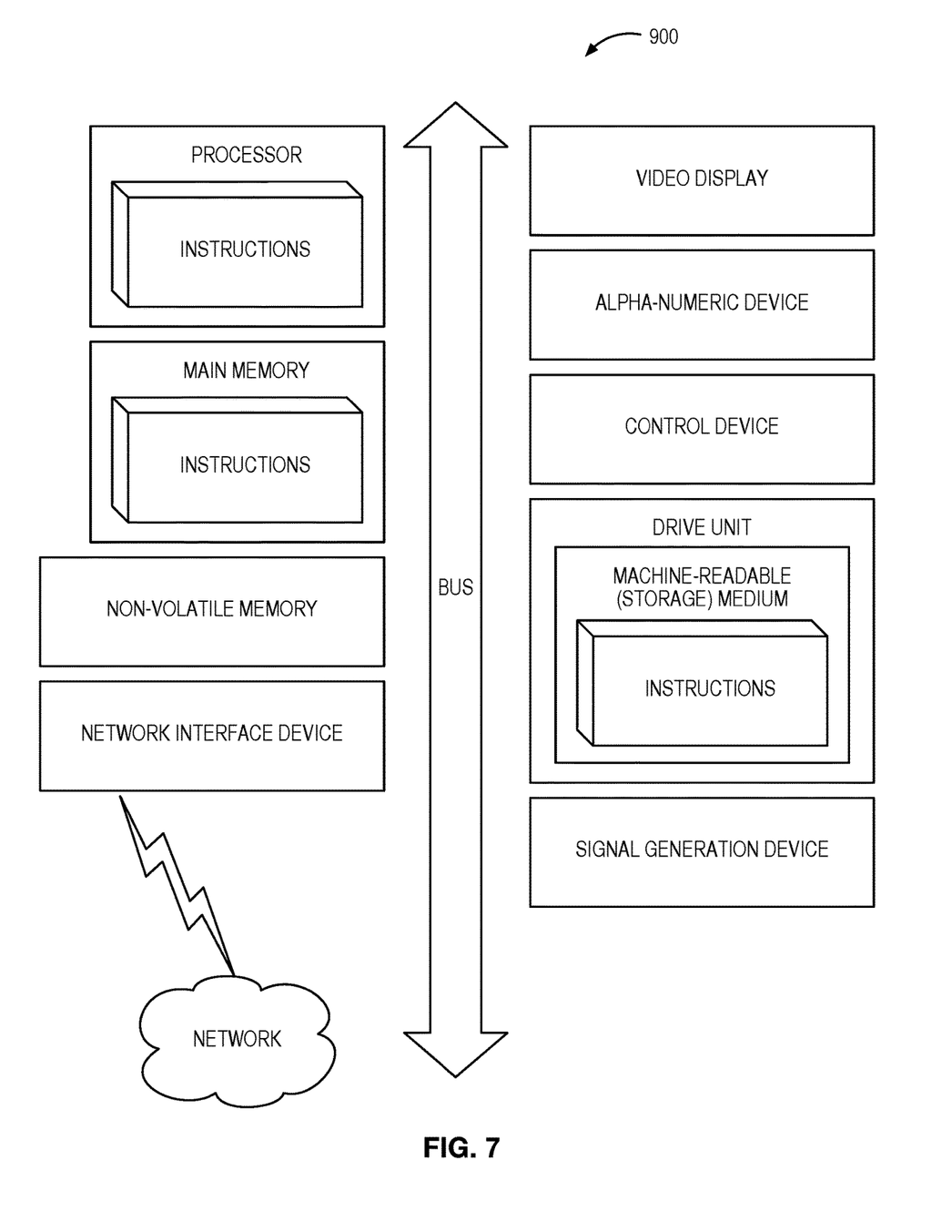
FIG. 7 is a diagrammatic representation of a machine in the example form of a computer system within which a set of instructions, for causing the machine to perform any one or more of the methodologies or modules discussed herein, may be executed.

Referring now to FIG. 7, a diagrammatic representation of a machine in the example form of a computer system 900 within which a set of instructions, for causing the machine to perform any one or more of the methodologies or modules discussed herein, may be executed.

In the example of FIG. 7, the computer system 900 includes a processor, memory, non-volatile memory, and an interface device. Various common components (e.g., cache memory) are omitted for illustrative simplicity. The computer system 900 is intended to illustrate a hardware device on which any of the components described in this specification can be implemented. The computer system 900 can be of any applicable known or convenient type. The components of the computer system 900 can be coupled together via a bus or through some other known or convenient device.

This disclosure contemplates the computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 900 may include one or more computer systems 900; be unitary or distributed; span multiple locations; span multiple machines; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 900 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EE PROM, a magnetic or optical card, or another form of storage for large amounts of data. Some of this data is often written, by a direct memory access process, into memory during execution of software in the computer 900. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing and entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 900. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 7 reside in the interface.

In operation, the computer system 900 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the computer-readable medium or computer-readable storage medium is shown in an exemplary embodiment to be a single medium, the term "computer-readable medium" and "computer-readable storage medium" should be taken to include a single medium or multiple media (e.g., a centralized or distributed database, and/or associated caches and servers) that store the one or more sets of instructions. The term "computer-readable medium" and "computer readable storage medium" shall also be taken to include any medium that is capable of storing, encoding or carrying a set of instructions for execution by the computer and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all exam page on pies in which a change in state for a binary one to a binary zero or vice-versa in a memory device may comprise a transformation, such as a physical transformation. Rather, the foregoing is intended as illustrative examples.

A storage medium typically may be non-transitory or comprise a nontransitory device. In this context, a non-transitory storage medium may include a device that is tangible, meaning that the device has a concrete physical form, although the device may change its physical state. Thus, for example, nontransitory refers to a device remaining tangible despite this change in state.

The above description and drawings are illustrative and are not to be construed as limiting the invention to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

While processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112 other aspects may likewise be embodied as a means-plus-function claim, or in other forms, such as being embodied in a computer-readable medium. (Any claims intended to be treated under 35 U.S.C. § 112 will begin with the words "means for".) Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example reference to "an additive" can include a plurality of such additives, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments, +/−10%, in some embodiments +/−5%, in some embodiments +/−1%, in some embodiments +/−0.5%, and in some embodiments, +/−0.1%, from the specified amount, as such variations are appropriate in the disclosed products and methods.

What is claimed is:

1. A method comprising:
at a server with a memory and a processor:
for each user in a shared media streaming session, retrieving a user track list and user playback history associated with the user from the memory;
filtering the user track lists according to predetermined rules;
combining the filtered user track lists to create a session segment;
generating a pool of recommended tracks;
determining whether there are multiple users in the shared media streaming session;

in response to a determination that there is a single user:
adding a plurality of recommended tracks to the session segment;
in response to a determination that there are multiple users:
identifying user-favored tracks in the session segment based on the user playback histories;
moving the user-favored tracks to the top of the session segment;
determining whether the session segment complies with licensing rules;
in response to a determination that the session segment does not comply with licensing rules, adding enough recommended tracks to the session segment to comply with the licensing rules;
adding the session segment to a session track list to be streamed to users of the shared media streaming session.

2. The method of claim 1, wherein the tracks are music files.

3. The method of claim 1, wherein the tracks are video files.

4. The method of claim 1, wherein the predetermined rules are based on user playback history.

5. The method of claim 1, wherein filtering the user track lists includes removing tracks that have been played recently.

6. The method of claim 1, wherein generating a pool of recommended tracks includes
applying a first set of algorithms to the user playback histories to generate a seed group, wherein each seed of the seed group is a user-favored track;
generating a plurality of normalized vectors containing track characteristics and user characteristics corresponding to each of the seeds;
for each of the plurality of normalized vectors, applying a second set of algorithms to the normalized vector to determine the recommendation probability, wherein the recommendation probability is the probability that the track characteristics and user characteristics of the normalized vector will yield successful recommendations;
identifying tracks with track characteristics and user characteristics corresponding to the track characteristics and user characteristics with the highest recommendation probability;
putting the identified tracks in a pool of recommended tracks.

7. The method of claim 6, wherein the first set of algorithms are clustering algorithms.

8. The method of claim 6, wherein the second set of algorithms are multi-class classification algorithms.

9. The method of claim 6, wherein the track characteristics include genre, release data or era, rank or other measure of popularity, tempo, melodic range, dynamics, and rhythm.

10. The method of claim 6, wherein the user characteristics include age, gender, and social graph characteristics.

11. A system comprising:
a memory; and
a processor operable to:
for each user in a shared media streaming session, retrieve a user track list and user playback history associated with the user from the memory;
filter the user track lists according to predetermined rules;
combine the filtered user track lists to create a session segment;
generate a pool of recommended tracks;
determine whether there are multiple users in the shared media streaming session;
in response to a determination that there is a single user:
add a plurality of recommended tracks to the session segment;
in response to a determination that there are multiple users:
identify user-favored tracks in the session segment based on the user playback histories;
move the user-favored tracks to the top of the session segment;
determine whether the session segment complies with licensing rules;
in response to a determination that the session segment does not comply with licensing rules, add enough recommended tracks to the session segment to comply with the licensing rules;
add the session segment to a session track list to be streamed to users of the shared media streaming session.

12. The system of claim 11, wherein the tracks are music files.

13. The system of claim 11, wherein the tracks are video files.

14. The system of claim 11, wherein the predetermined rules are based on user playback history.

15. The system of claim 11, wherein the processor is operable to filter the user track lists by removing tracks that have been played recently.

16. The system of claim 11, wherein the processor is further operable to generate a pool of recommended tracks by:
applying a first set of algorithms to the user playback histories to generate a seed group, wherein each seed of the seed group is a user-favored track;
generating a plurality of normalized vectors containing track characteristics and user characteristics corresponding to each of the seeds;
for each of the plurality of normalized vectors, applying a second set of algorithms to the normalized vector to determine the recommendation probability, wherein the recommendation probability is the probability that the track characteristics and user characteristics of the normalized vector will yield successful recommendations;
identifying tracks with track characteristics and user characteristics corresponding to the track characteristics and user characteristics with the highest recommendation probability;
putting the identified tracks in a pool of recommended tracks.

17. The system of claim 16, wherein the first set of algorithms are clustering algorithms.

18. The system of claim 16, wherein the second set of algorithms are multi-class classification algorithms.

19. The system of claim 16, wherein the track characteristics include genre, release data or era, rank or other measure of popularity, tempo, melodic range, dynamics, and rhythm.

20. The system of claim 16, wherein the user characteristics include age, gender, and social graph characteristics.

* * * * *